United States Patent

[11] 3,600,037

| [72] | Inventor | Thomas E. Lohr<br>Warren, Mich. |
|---|---|---|
| [21] | Appl. No. | 830,736 |
| [22] | Filed | June 5, 1969 |
| [45] | Patented | Aug. 17, 1971 |
| [73] | Assignee | Allied Chemical Corporation<br>New York, N.Y. |

[54] VEHICLE SEAT WITH INDIVIDUALLY PIVOTAL BOLSTER SECTION
8 Claims, 5 Drawing Figs.

[52] U.S. Cl. .................................................. 297/312,
       297/433
[51] Int. Cl. .................................................. A47c 7/50,
       B60n 1/06

[50] Field of Search .......................................... 297/284,
       312, 337, 391, 396, 403, 433

[56] References Cited
UNITED STATES PATENTS

| 2,285,112 | 6/1942 | Dorton | 297/403 X |
| 3,057,660 | 10/1962 | Schneider | 297/312 |
| 3,186,763 | 6/1965 | Ferrara | 297/410 |
| 3,215,468 | 11/1965 | Swenson et al. | 297/284 |
| 3,446,532 | 5/1969 | Cramer | 297/312 |

*Primary Examiner*—Casmir A. Nunberg
*Attorney*—Hauke, Krass, Gifford and Patalidis

ABSTRACT: A vehicle seat having a seat portion and a back rest portion and an independently adjustable bolster pivotally supported in the front section of the seat portion.

PATENTED AUG 17 1971
3,600,037
SHEET 1 OF 2
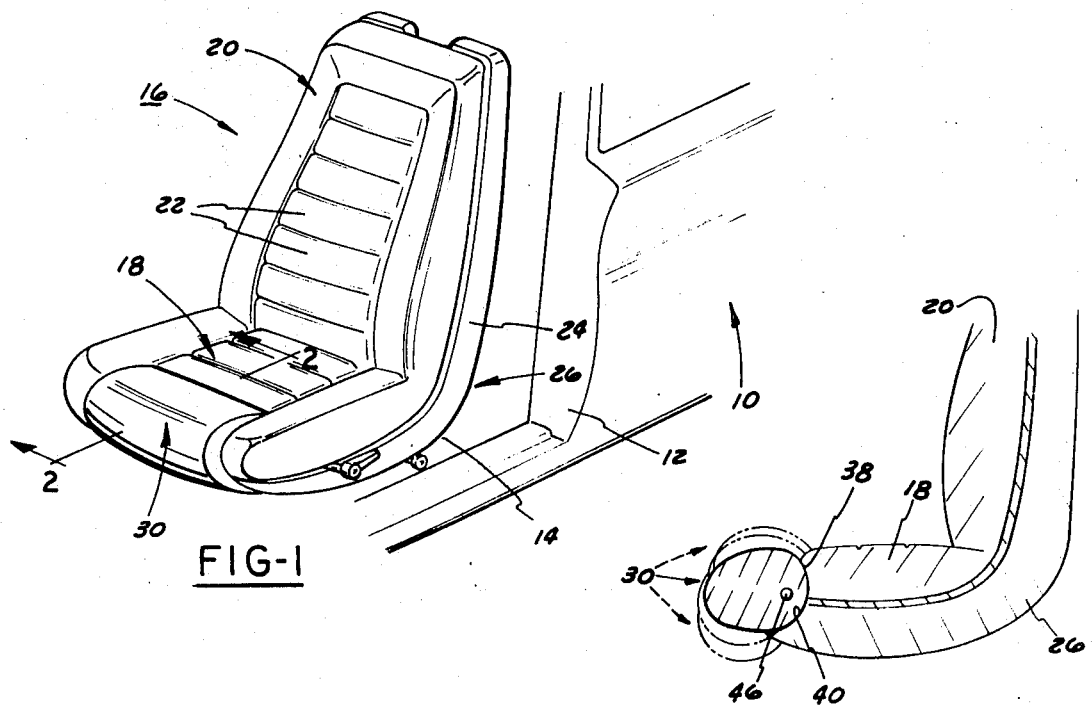
FIG-1
FIG-2
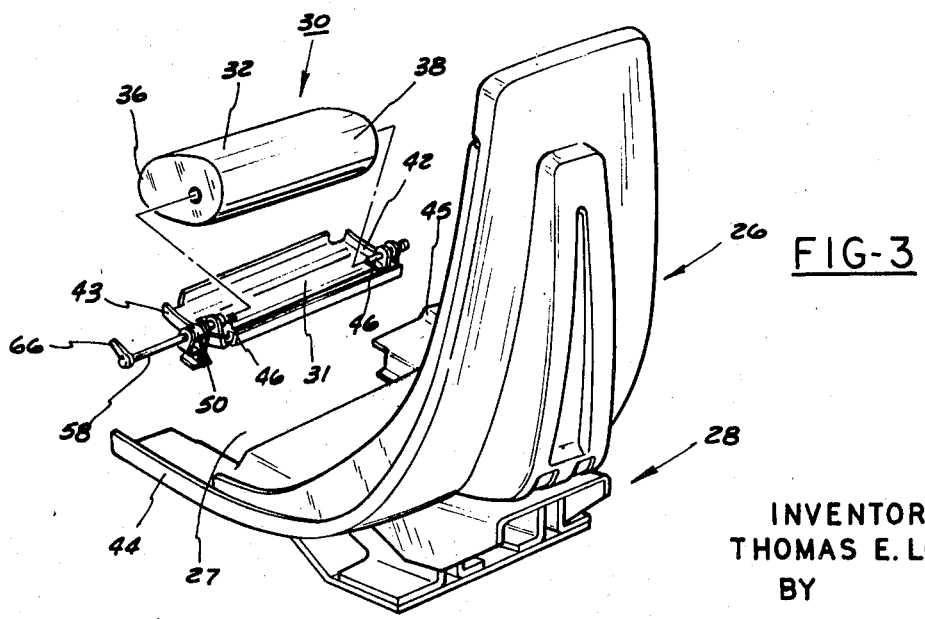
FIG-3
INVENTOR
THOMAS E. LOHR
BY
Hauke Knass Gifford & Patalidis
Attorneys

INVENTOR
THOMAS E. LOHR
BY

Hauke Knaus Gifford & Patalidis
Attorneys

VEHICLE SEAT WITH INDIVIDUALLY PIVOTAL BOLSTER SECTION

BACKGROUND OF THE INVENTION

1. Field of the Invention

The present invention relates to vehicle seats and more particularly to such seats including an independently adjustable bolster section provided in the front section of the seat.

2. Description of the Prior Art

It is known that during prolonged driving periods the thighs or pelvis of the person occupying the seat are subject to muscle fatigue which causes severe leg strain, which occasionally may develop into painful cramps. Although the muscle fatigue can be combated somewhat by continuously shifting the legs to different positions, this procedure remedies the situation only for a short time. Therefore, to increase the comfort of the seat occupant, the front edge of the seat is usually raised upwardly to provide a firm support for the thighs of the occupant. However, this measure alone is not sufficient to eliminate muscle fatigue.

An automotive seat construction is known in which the front end of the seat is made angularly pivotal relative to the primary seating portion in an attempt to provide maximum comfort for the support of the thighs of the occupant of the seat to thereby combat muscle fatigue. This known construction is provided with a hinge mechanism for the thigh support and thus actually causes an opening or space to be formed between the seat proper and the hinge-type support thereby tending to cause discomfort in this area. Additionally, known thigh support mechanism must be manually locked in adjusted position by a hand locking screw, which is subject to wear causing the mechanism to lose its locking ability and thus its rigid support.

SUMMARY OF THE INVENTION

Accordingly, the present invention provides an improved adjustable pivotal thigh support for a vehicle seat having an improved automatic locking mechanism to retain the thigh support in any desired adjusted position.

The independent thigh support is shaped in the form of a bolster having a round rear surface blending into and supported within a similarly shaped socketlike longitudinal front edge recess of the primary seating portion so as to permit the thigh support bolster section to angularly pivot therein without creating an open space between the primary seating portion and the thigh support upon adjustment of the latter, and thus at all times maintain the continuity of the seating surface.

The thigh support bolster section of the present invention is supported on a shaft extending longitudinally through the bolster section, which is supported for rotation at both ends outwardly of the bolster section within appropriate bearing supports in the seat molding. The shaft is formed in two sections which are connected by a friction clutch normally securely locking the bolster section against pivotal movement. The friction clutch is connected to a manual release having a hand grip or lever outwardly of the seat molding for manipulation to release the clutch and to thus permit angular pivotal adjustment of the bolster section to a desired position. Upon release of the lever, the friction clutch automatically and securely locks the bolster section in the adjusted position. The clutch may be a conventional, bidirectional friction clutch, such as is used in window mechanisms or the like. A stop is provided within the seat structure to limit angular downward movement of the bolster section.

A copending application Ser. No. (ACH-105-C) describes a new vehicle seat adjustment mechanism in which the front portion of the seat tips upwardly slightly as the seat is adjusted toward the front of the vehicle. The bolster arrangement of the present invention has special usefulness in such an assembly by providing means for compensating for the upward and downward movement of the front section of the seat. For this reason the present invention will be described with reference to the assembly of the aforementioned copending application although it is to be understood that the present invention is not intended to be limited to such an assembly.

DESCRIPTION OF THE DRAWINGS

The description makes reference to the following drawings illustrating a preferred embodiment of the present invention in which like reference characters refer to like parts throughout the several views, and in which:

FIG. 1 is a perspective schematic illustration of an exemplary bucket seat vehicle installation embodying the present invention;

FIG. 2 is a partial cross section of the front end of the bucket seat shown in FIG. 1 illustrating the thigh support bolster section in various adjusted positions;

FIG. 3 is a perspective exploded view of the bucket seat construction shown in FIG. 1 as seen from the rear without the cushion and trim material for better illustration of the structure of the seat;

DESCRIPTION OF THE PREFERRED EMBODIMENT

Figure 4:
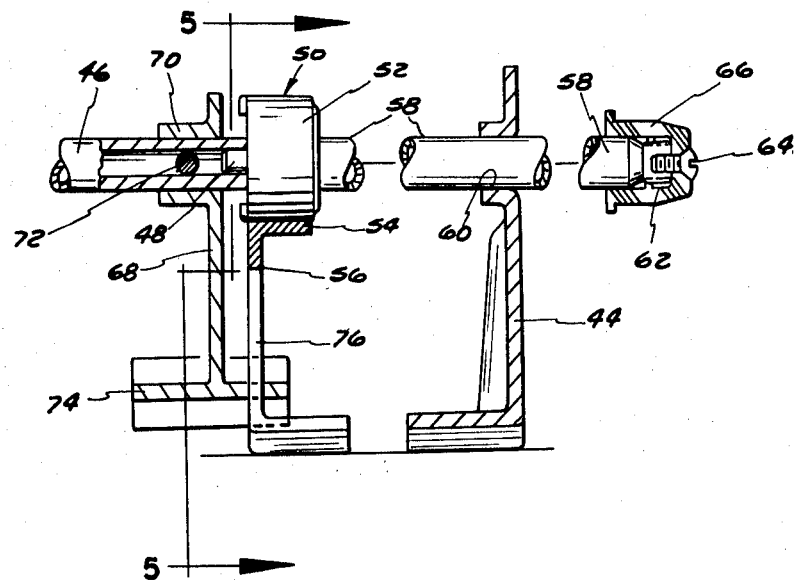
FIG. 4 is an enlarged fragmentary longitudinal cross section through the bolster section pivot mechanism constructed in accordance with the present invention.

With reference to FIG. 1, a vehicle body is schematically indicated at 10, having a door opening 12 and an inside floor section 14.

A vehicle seat unit 16 is shown disposed within the vehicle just inside and adjacent to the door opening 12, which is supported on the vehicle floor 14. The seat unit 16 is of the bucket seat type, comprising a seating portion 18 and a backrest portion 20 rigidly secured thereto so as to form a unitary structure. The seating portion 18, as well as the backrest 20, are composed of the usual cushions 22 and are contained as a unit within a seat molding or frame 24 of sheet metal or other suitable sheet material.

As seen from FIG. 3, the structure of the seat unit 16 comprises a rigid backup member in the form of a cradle-type shell 26 which is supported on a seat adjusting mechanism 28 for longitudinal sliding and tilting adjustment of the seat unit. This mechanism is completely described in the aforementioned copending application and therefore will not be described in detail here. However, the adjustment mechanism 28 as more fully disclosed in the copending application produces upward movement of the front portion of the seating portion 18 as the seat unit 16 is moved toward the front of the vehicle.

Figure 5:
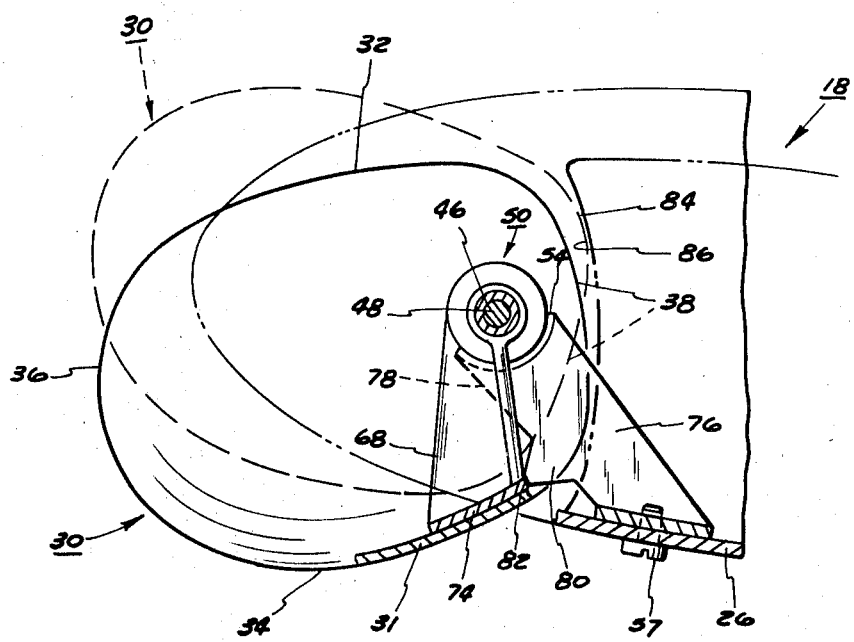
FIG. 5 is a transverse cross section through the pivot mechanism of the bolster section as seen along line 5-5 of FIG. 4.

With particular reference to FIGS. 3-5, to compensate for the tilting movement of the seat as well as adjustment for the comfort of the driver an adjustable thigh supporting bolster portion 30 is pivotally secured to the front end of the seating portion 18. The bolster portion 30 comprises a cushion or pillowlike structure of oblong shape corresponding to the width of the seat portion. The cross section of the bolster 30, as particularly seen in FIGS. 2 and 5, is of somewhat irregular elliptical form having an arcuate upper surface 32 and a corresponding arcuate lower surface 34, both of which are connected at the front by an arcuate surface 36, having a substantially smaller radius than the arcuate upper and lower surfaces. At the rear end of the bolster portion, the upper and lower surfaces blend into a connecting arcuate surface 38 having a slightly larger radius than the arcuate front surface 36. The front edge of the seating portion 18 provides a concavely shaped surface 40 having a radius corresponding substantially to the radius of the arcuate rear surface 38 of the bolster portion 30 so that in the normal position of the bolster portion the rear surface 38 blends into the concave surface 40 of the seating portion, as shown in solid lines in FIG. 2.

The bolster 30 is horizontally pivotally supported at the front end of the seat shell frame 26 on a bolster bottom pan 31 disposed within a corresponding recess 27 in the front end of the shell-like seat frame 26. As seen in FIGS. 4 and 5, the bolster portion 30 is supported for pivotal angular rotation relative to the stationary seating portion 18 on a pivot shaft 46 extending longitudinally through the bolster portion. The shaft 46 is rotationally supported adjacent the inner end of the bolster portion outwardly thereof within an appropriate bearing aperture in a side flange 42 of the bottom pan 31 of the bolster portion, as indicated in FIG. 3.

FIG. 4 illustrates in longitudinal cross section the outer end of the bolster pivot support which includes the adjusting mechanism for the bolster portion, which will now be described. As shown in FIG. 4, the outer end of the pivot shaft 46 is operably connected to the output shaft 48 of a friction clutch mechanism 50 which housing 52 is secured within a support 54 of a bracket 56 normally secured in assembly to the bottom of the seat shell-frame 26 by means of fasteners 57 or the like, as seen in FIG. 5. The friction clutch 50 is a conventional no-back clutch of the bidirectional type, such as is frequently used for adjustment of vehicle windows and the like, adapted to retain a member in a certain adjusted position.

The other side of the friction clutch 50 is connected to a rotatable shaft 58 which is supported for rotation within a bearing aperture 60 in the front side flange 44 of the shell-like seat frame 26. Secured to the end of the shaft 58 by means of serrations or splines 62 and a fastener 64 is a lever 66 adapted for rotatable manipulation of the shaft 58.

As most clearly seen in FIGS. 4 and 5, the bolster portion 30 is provided with a bracket 68 adjacent the clutch mechanism 50, which has an apertured boss portion 70 at its upper end through which the pivot shaft 46 extends to be nonrotatably secured to the shaft by means of a roll pin 72 or the like extending through the shaft and secured to the boss portion so that the bracket 68 is forced to pivot with the bolster portion 30. The lower end of the bracket 68 is formed into an integral transverse portion 74 which is secured by any conventional means to the bottom pan 31 of the bolster portion 30, and which serves a purpose to be explained hereafter.

As most clearly shown in FIG. 5, the clutch support bracket 56 is angularly forwardly disposed to extend beyond the front concave surface 40 of the seating portion 18 and has an intermediate web portion 76 the front edge 78 of which is provided with a protrusion 80 having a lateral edge substantially parallel with the front edge 78. The protrusion 80 of the support bracket 56 is disposed along the radius described by the bolster bracket 68 upon angular pivotal movement of the bolster portion around the center of the pivot shaft 46. As shown in FIG. 5 in solid lines, when the bolster portion 30 is angularly pivoted downwardly after release of the clutch 50, the front end of the flange portion 74 of the bolster bracket 68 comes to abut against the lateral edge 82 of the protrusion 80 of the support bracket 56 to restrict further pivotal movement of the bolster to thereby provide a downward limit stop for the bolster portion.

As further shown in FIG. 5, pivotal angular movement of the bolster portion upwardly is limited by abutment of the upper edge 84 of the bolster portion against the upper front edge 86 of the concave front surface 40 of the seating portion 18, as indicated in phantom lines in FIG. 5. By provision of the friction clutch mechanism 50, the bolster portion 30 can be securely retained in any intermediate position between the maximum downward position shown in solid lines in FIG. 5 and the maximum upward position shown in phantom lines in FIG. 5 to provide the most comforting thigh support for an occupant of the seat 16.

In operation: to angularly adjust the bolster portion 30 from its normal horizontal position as shown in solid lines in FIG. 2 to any angular up or down position relative to the seating portion 18 between the maximum up or down positions shown in FIG. 5, the locking effect of the friction clutch 50 is released by means of rotation of the release shaft 58 upon manipulation of the release lever 66. Thereafter, the bolster portion 30 is free to be manually swung upwardly or downwardly as condition requires and to an extent determined by the length of time the lever 66 is held in the clutch release position. Upon release of the lever 66, the shaft 58 rotates back to its initial position thereby locking the clutch mechanism 50 to solidly secure the bolster portion in the adjusted position obtained at the time release of the lever 66.

It will be evident from the foregoing, that the present invention provides an improved and relatively simple adjusting and retaining mechanism for an individually pivotal bolster portion for an automotive seat to assure maximum comforting thigh support for an occupant of the seat.

Having described my invention I claim:

1. In combination with a vehicle seat having a seating portion and a back rest retained in a frame structure, an independently supported angularly pivotal bolster portion attached adjacent to the front end of said seating portion adapted to support the thighs of an occupant of said seat; a pair of side flanges extending upwardly from said frame structure at the front end thereof; a pivot shaft extending longitudinally through said bolster portion and nonrotatably secured thereto; said shaft being supported for rotation at both ends outwardly of said bolster portion with said pair of side flanges of said frame structure whereby said bolster portion s pivotable for limited angular up and down movement relative to said seating portion between a maximum lower and upper limit position; and means for locking said bolster portion in any selected position between said limit positions.

2. The combination as defined in claim 1, in which said pivot shaft at one end is operably connected to said locking means at one side thereof and including means to unlock said locking means operably connected to the other side of said locking means.

3. The combination as defined in claim 1, further providing means associated with said frame structure comprising a limit stop and means associated with said bolster portion for pivotal movement therewith adapted for abutment against said limit stop to restrict pivotal movement of said bolster portion in one direction.

4. The combination as defined in claim 3, said means associated with said frame structure comprising a bracket having an intermediate web portion provided with a protrusion and said means associated with said bolster portion comprising a flange adapted to abut against said protrusion in one angular direction of pivotal movement of said bolster portion.

5. A seat assembly for a motor vehicle comprising:
a seating portion;
a back rest portion;
means separate from said seating portion and backrest portion comprising a support for the thighs of a person sitting on said seat;
means for angularly adjustably securing said thigh supporting means to said seating portion at the front end thereof, said thigh supporting means comprising an oblong cushioned bolster having a substantially elliptical cross section including an arcuate rear surface, said seating portion having a concave front surface substantially matching said arcuate rear surface of said bolster to thereby pivotally support said bolster for angular movement along said concave surface.

6. The seat assembly as defined in claim 5, in which said means to angularly adjustably securing said thigh supporting means to said seating portion comprises a pivot shaft extending nonrotatably through said bolster for rotatable support on said seating portion at the front end thereof.

7. The seat assembly as defined in claim 5, further comprising means to lock said thigh supporting means against said pivotal angular movement.

8. The seat assembly as defined in claim 5, further comprising manually operable means to release said locking means to enable angular adjustment of said bolster.